Dec. 15, 1936.   E. H. MUELLER   2,064,623
SAFETY VALVE
Filed Jan. 17, 1935   3 Sheets—Sheet 1
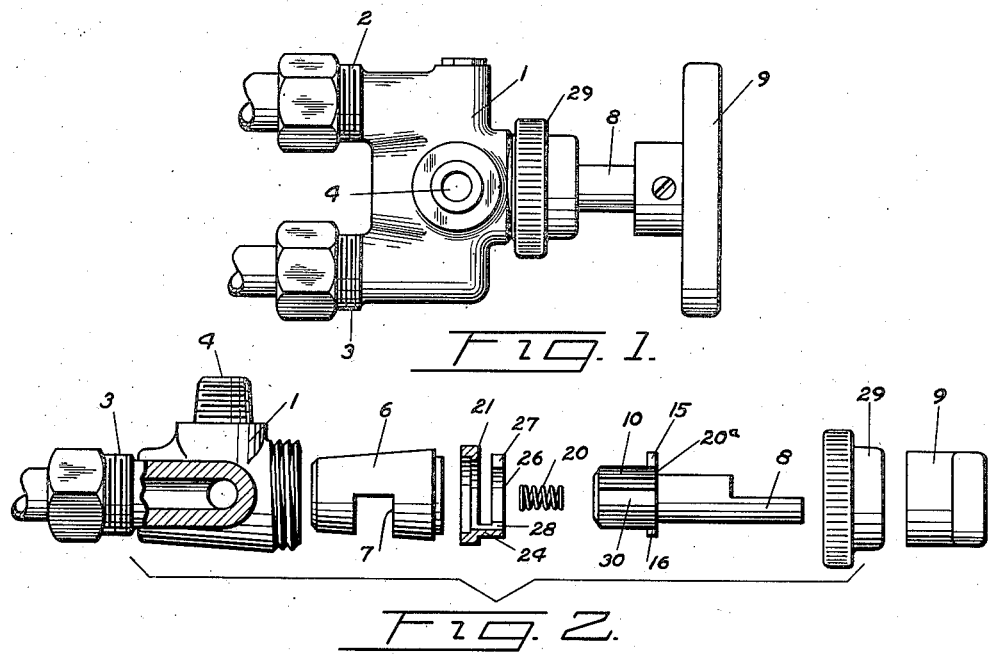
Fig. 1.
Fig. 2.
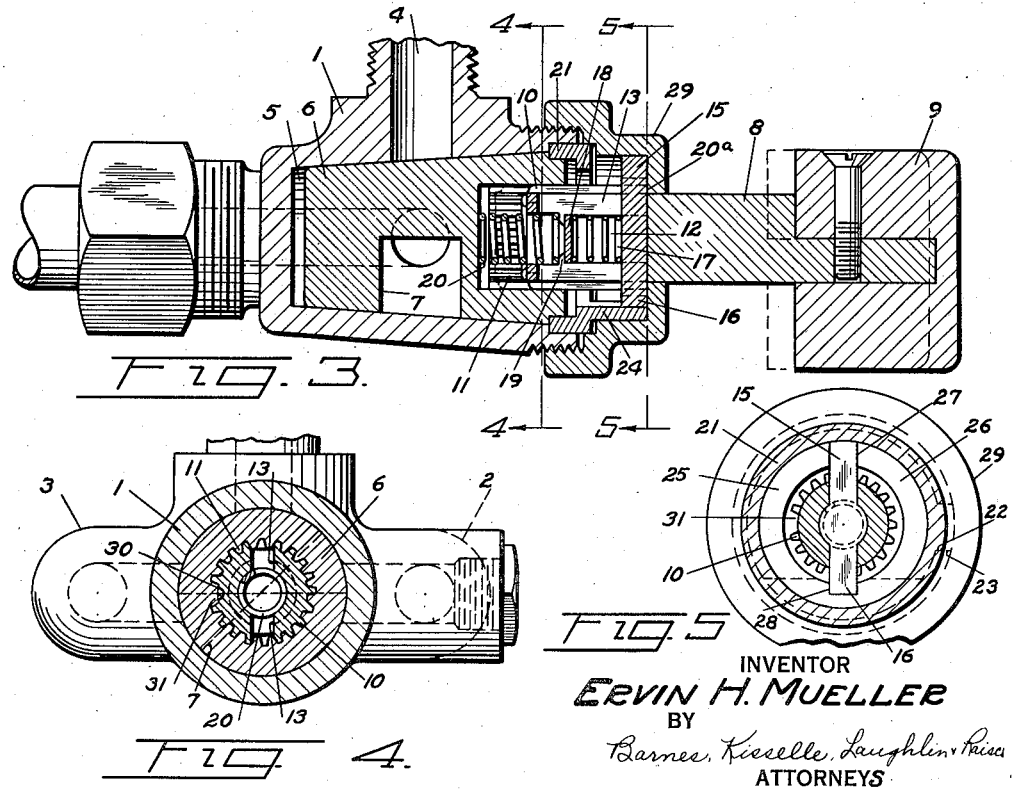
Fig. 3.
Fig. 4.
Fig. 5.
INVENTOR
ERVIN H. MUELLER
BY
Barnes, Kisselle, Laughlin & Raisch
ATTORNEYS

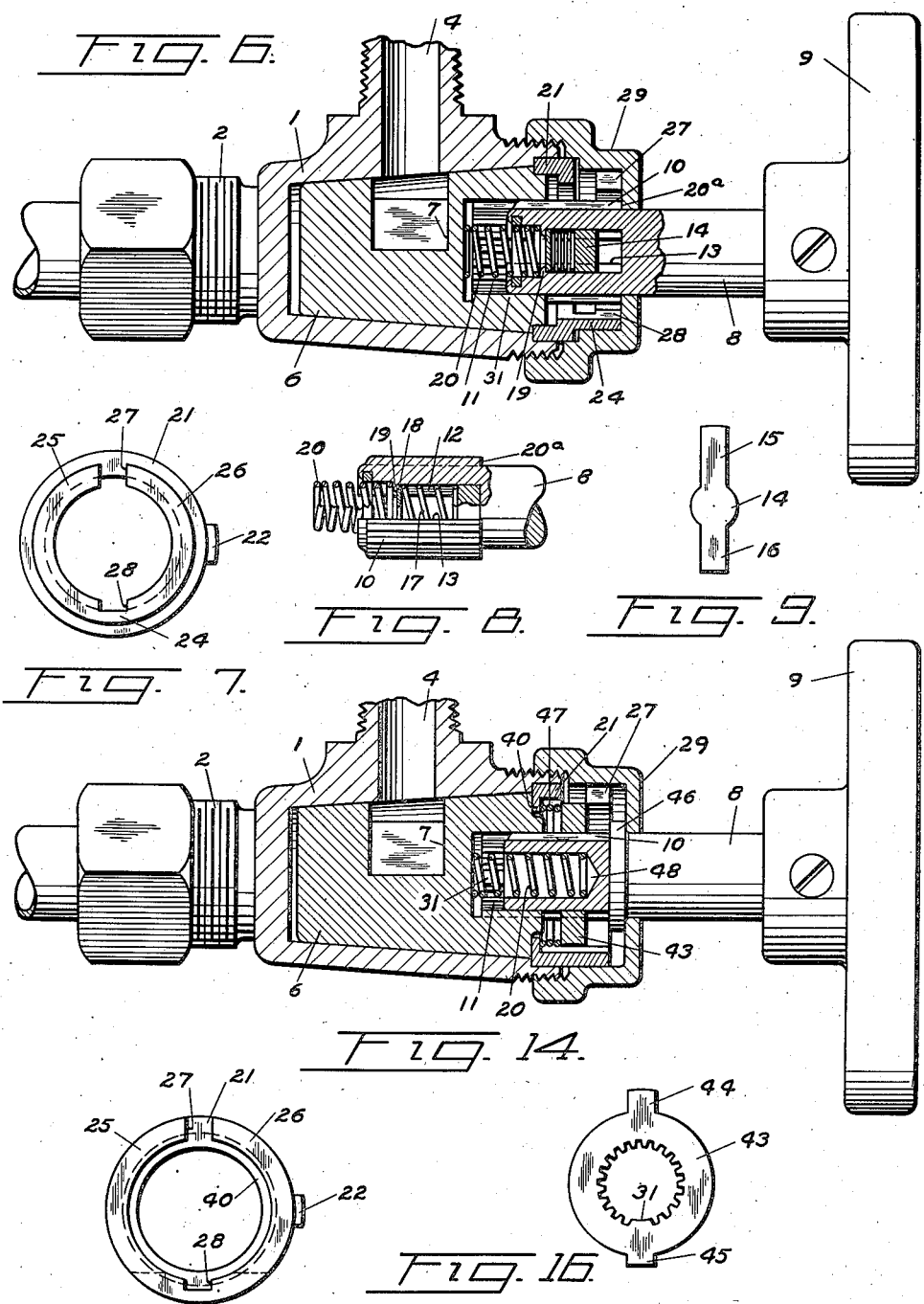

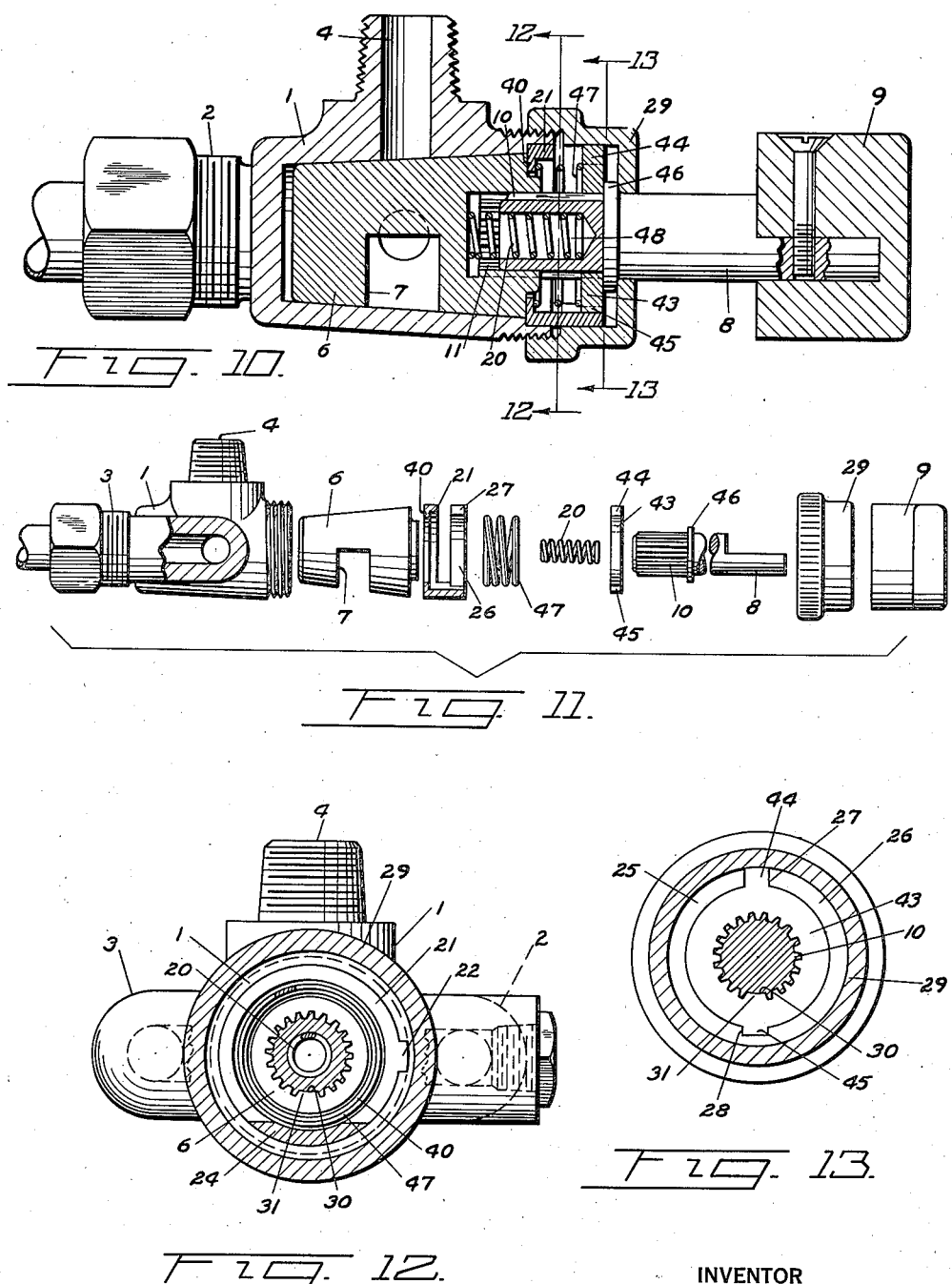

Patented Dec. 15, 1936

2,064,623

UNITED STATES PATENT OFFICE 2,064,623

SAFETY VALVE

Ervin H. Mueller, Detroit, Mich.

Application January 17, 1935, Serial No. 2,220

6 Claims. (Cl. 251—165)

This invention has to do with safety valves, and it is concerned particularly with the provision of a valve which is locked when the valve is in a predetermined position, preferably when the valve is turned off. The invention aims to provide an improved locking valve, especially useful for the controlling of the gas supply to gas burners or other equipment, although obviously the valve is not limited to such use.

Among the objects of the invention are: The provision of a valve which, notwithstanding the fact that the valve, as a locking valve, is composed of a number of assembled parts, is of strong durable construction; a valve of the locking type wherein in one form of the invention the locking means and the element to be locked thereby are self-contained and in another form of the invention of such an arrangement as to be easily and quickly assembled; a valve locking structure so arranged that the assembly can be made in only one way, and this notwithstanding the fact that the valve may be of the two-way type. To this end the assembly may be made only when the lock is in position to be effective, and at this time the valve member must be in off position else assembly cannot be made. These and other objects will be more readily appreciated by consideration of the following detailed description in connection with the accompanying drawings.

Fig. 1 is a plan view of a two-way valve in which the invention may be incorporated.

Fig. 2 is a disassembled view showing the several elements entering into the structure.

Fig. 3 is an enlarged cross-sectional view taken through the valve structure showing the parts with the valve off and locked.

Fig. 4 is a sectional view taken substantially on line 4—4 of Fig. 3.

Fig. 5 is a sectional view taken substantially on line 5—5 of Fig. 3.

Fig. 6 is a view similar to Fig. 3 showing the position of the several parts when the valve is turned on and the lock is released.

Fig. 7 is a detailed view of the locking cage.

Fig. 8 is a cross-sectional view detailing a portion of the stem structure and locking member.

Fig. 9 is an elevational view of the locking member.

Fig. 10 is a sectional view taken through a modified form of the invention.

Fig. 11 is a view showing the several parts in disassembled relation.

Fig. 12 is a sectional view taken substantially on line 12—12 of Fig. 10.

Fig. 13 is a view taken substantially on line 13—13 of Fig. 10.

Fig. 14 is a sectional view similar to Fig. 10 showing the valve turned on and with the lock ineffective.

Fig. 15 is a detailed view of the cage used in the modified form.

Fig. 16 is a detailed view of the locking member used in the modified form.

The valve may comprise a body 1 having an outlet 2, and outlet 3 and an inlet 4. The inlet is to be connected to a suitable supply means such as a manifold, and the outlets 2 and 3 may lead to separate burners. In the case of a gas stove, the outlet 2 may, for example, supply the burner or burners for the oven, and the outlet 3 the burner or burners of a broiler. The valve body is hollow to provide a valve seat 5 for a valve member 6, and the valve member may have a passageway 7 so that when the valve is turned in one direction the outlet 2 is connected to the inlet 4 and when turned in another direction the outlet 3 is connected to the inlet 4. An operating stem is shown at 8 and it may be fashioned to receive a handle 9. The stem has one end provided with external serrations 10 and the valve member 6 has a bore with internal serrations as at 11 for slidably receiving said end of the stem.

The serrated end of the stem is provided with a central bore 12 with opposite lengthwise extending slots 13, and a locking member 14 having a central portion substantially fitting the bore is slipped into the bore, and it has projecting locking fingers 15 and 16. A locking spring 17 is situated in the bore so that it acts upon the locking member and it is backed up by a member 18. The member 18 may be in the form of a disc and it is held positioned in the bore by a flange 19 which comprises metal which has been turned over from the body of metal in the stem. Thus the locking member 14 and its spring are assembled in the stem independently of any other of the parts so that the stem and locking member are self-contained. A coil spring 20 is disposed between the stem and the bottom of the bore 11 of the valve so as to react against the valve member and the stem. The enlarged end of the stem forms a shoulder 20a which reacts against a cap 29 screw threaded in the valve body. A locking cage 21 has a ring-like base for seating against the valve body as shown in Fig. 3. The cage has a projection 22 which seats in a cut-away portion 23 in the valve body so that the cage is held from rotation and may be assembled only in one position relative to the body. The cage has an axial projection 24 which carries curved arms 25 and 26, the upper ends of which are spaced apart as shown in Fig. 7, thus forming a notch 27 for the locking finger 15. The arms 25 and 26 are spaced from the base of the cage sufficient distance to clear the projections 15 and 16 when the stem is rotated. The cage is slotted as at 28, which slot is opposite the notch 27, and this slot receives the projection 16 of the locking member.

The serrated portions of the valve member and stem are provided with identifications or irregularities so that they must be assembled only in one way. To this end the serrated portion of the stem has a flat 30, which may be provided by merely eliminating one rib, and the stem has a flat 31 provided by skipping or eliminating one groove so that they interfit as shown in Fig. 4.

The assembly may be made as follows: The valve member is placed in the valve body, and then the cage located; with the spring 20 between the valve member and stem, the stem is slidably fitted to the valve member. In order to fit the stem into the valve, projections 15 and 16 must align with the slots 27 and 28, which is the locked position of the stem. The valve member, of course, must be so positioned that the flats 30 and 31 align, and accordingly in the previous positioning of the valve member in the body, the valve member was so properly positioned as by means of a suitable jig (in factory assembly) and this is off position. Therefore, it will be seen that when the assembly is made the valve is off. The cap 29 is now passed over the stem and screw threaded to the body.

The operation of the valve is as follows: Upon assembly the parts appear in the position shown in Fig. 3 with the valve off and the projections 15 and 16 located in the recesses 27 and 28. The stem cannot now be turned. To release the lock the stem is pushed inwardly to the dotted line position shown in Fig. 3, thus compressing spring 20. This aligns the projections 15 and 16 with the clearance between the base of the cage and the arms 25 and 26 so that now the valve may be rotated in either direction to connect outlet 2 or outlet 3 with inlet 4. Upon release of the axial pressure on the stem, the stem shifts axially back to its original position as shown in Fig. 6, because spring 20 is stronger than spring 17. This compresses spring 17. Spring 20 at all times tends to hold the valve on its seat and tends to hold the stem shifted outwardly, so that there is no looseness in the stem. When the valve is turned off the spring 17 shifts the locking member 14 axially when the projections 15 and 16 come into registry with the slots 27 and 28. Thus it will be observed that in this locking action there is no shift or other movement of the stem, and that the locking spring 17 has no effect upon the stem in this locking action or upon the valve member at any time. Accordingly, there is a self-contained lock for the stem and it is the stem which is locked when the valve is off. When the valve is on the spring 17 is compressed by reason of the projections 15 and 16 reacting against the arms 25 and 26; thus the locking member is held at right angles to the stem and there is no cocking or other action which would tend to bind. Further, a double lock is effected by reason of the two projections and two recesses therefor.

The modified form may comprise a similar body, valve, stem, cap, etc., and these parts are identified by like reference characters. In this form a serrated part of the stem 10 fits into the serrated aperture of the bore 11 in the valve. The cage 21 is similar except it may have an inwardly extending flange 40, and which fits to the body of the valve with the projection 22. A lock member, however, is in the form of a washer 43 with opposite projections 44 and 45 and with a serrated aperture for fitting over the serrated end of the stem, and the stem may have a collar or rib 46. A coil spring 47 of relatively large diameter acts on the locking washer and reacts on the flange 40 of the cage. The coil spring 20 lies between the valve member and the stem, for which purpose the serrated end of the valve member may be provided with a bore 48. The cap 29 is designed to be reacted against by the rib 46.

The assembly and operation are as follows: When the valve is positioned in the valve body and in off position the cage is properly located by reason of the extension 22, the two springs properly positioned, and then the stem with the locking washer thereon is inserted into slidable engagement with the valve member and finally the cap may be screw threaded to the body. The parts thus assembled appear in Fig. 10, with the projections 44 and 45 locked in the notches in the cage and the valve in off position. To turn the valve on the stem is shifted inwardly and then turned when the projections 44 and 45 align with the clearances in the cage. This action of pushing in the stem compresses both the spring 47 and the spring 20. However, when the axial pressure is relieved, the spring 20 shifts the stem outwardly until its collar reacts against the cap, but the spring 47 remains compressed on account of the cage holding the projections 44 and 45. It will, of course, be understood that the valve may be turned in either direction. When the valve is turned off the spring 47 shifts the locking washer and the projections 44 and 45 seat in the recesses in the cage. In this form of the invention the lock functions only on the stem, but due to the fact that the locking washer and locking spring are mounted outside the stem instead of inside, these parts are not a self-contained unit when disassembled from the valve body. However, the same general locking action is obtained in that there is a double lock, and the locking washer remains substantially at right angles to the stem so that there is no cocking action which would tend to bind the parts and prevent improper functioning.

In both forms of the invention the stem and valve member are united by a strong spline or serrated connection, and this connection is separate and apart from the locking mechanism so that the same is not weakened by provision of clearances or the like to accommodate locking structure.

I claim:

1. A locking valve comprising, a valve body having a valve seat, a valve member rotatable on the seat, a stem slidably interlocked with the valve member, a cap connected to the valve body, a spring interposed between the valve and stem for holding the valve on its seat with the stem reacting against the cap, a locking member slidably interlocked with the stem, a second spring acting on the locking member, means on the stem against which the second spring reacts whereby the second spring and locking member are in unit assembly with the stem, a locking notch, and the said locking member having a projection receivable in the locking notch by the action of the second spring, said locking member and its spring being shiftable bodily with the stem to displace the said projection from the notch, whereby the valve may be rotated.

2. A locking valve comprising, a valve body having a valve seat, a valve member rotatable thereon, a stem slidably interlocked with the valve member, a cap secured to the valve body, a spring interposed between the valve and stem for urging the valve against its seat with the stem reacting against the cap, said stem having an axial bore with a slot, a locking member carried by the stem and having a locking projection extending out through the slot, a second spring in the bore of the stem and acting upon the locking member, abutment means on the stem against which the second spring reacts, whereby the second spring and locking member are in unit assembly with the stem, and a locking notch for receiving the projection on the locking member, said locking member and its spring being shiftable bodily with the stem for displacing the projection from the notch, the first named spring being stronger than the second spring, whereby upon turning of the valve and release of the stem the first spring shifts the stem into its reactive position on the cap and compresses the second named spring, said second named spring serving to urge the locking member to position the projection in the notch when the same comes into alignment with the notch.

3. A two-way locking valve comprising, a valve body with a valve seat, a valve rotatable on the seat, a stem slidably interlocked on the valve, a spring between the valve and stem, a cap secured to the valve body, said spring holding the valve on its seat with the stem reacting against the cap, said stem having an axial bore with opposite slots, a locking member situated in the bore and having oppositely extending locking projections extending out through the slots, a second spring in said bore and acting upon the locking member, means on the stem against which the second spring reacts, whereby the second spring and locking member are assembled as a unit with the stem, a locking cage between the valve body and cap having a base adjacent the valve body and means spaced therefrom defining locking notches for receiving the projections on the locking member, said locking member being shiftable with the stem against the action of the first spring to displace the projections from the notches and align them with the space of the cage, whereby the valve and stem may be turned in either direction, the first named spring serving to shift the stem away from the valve and being stronger than the second named spring, whereby to compress the second spring as the projections on the locking member react against said means of the cage, and said second spring serving to shift the locking member as the projections come into alignment with the said notches for positioning the projections in said notches to lock the valve stem.

4. A two-way locking valve comprising, a valve body provided with a valve seat, a valve rotatable on the seat, said valve having an axial bore therein provided with internal serrations, a stem having external serrations slidably interlocked in said bore, a cap secured to the valve body, a spring in the bore of the valve and between the valve and stem serving to hold the valve on its seat with the stem reacting against the cap, said stem having an axial bore with opposite slots connecting thereinto, a locking member having a part positioned in the bore of the stem and having locking projections extending out through the slots, a second spring in the bore of the stem acting upon the locking member, abutment means on the stem against which the second spring reacts, a cage having a base next adjacent the valve body and a part next adjacent the cap and removed from the base to provide a space, said part having locking notches for receiving the projections on the locking member.

5. A locking valve comprising, a valve body having a valve seat, a valve member rotatable on the seat, said valve member having an internally serrated bore, an operating stem having a serrated end slidably fitting within the bore with the serrations interfitting to form a driving connection, a cap secured to the valve body, a spring interposed between the valve member and the stem for holding the valve member on its seat with the stem reacting against the cap, a locking member non-rotatably and slidably carried by the stem, a second spring acting on the locking member, means on the stem against which the second spring reacts whereby the second spring, locking member and stem are shiftable axially as a unit without compression of the second spring, a locking notch, said locking member having a part receivable in the locking notch by the action of the second spring to lock the valve member against rotation and being disengageable from the notch by axial movement of the stem against the action of the first mentioned spring whereby the valve member may be rotated.

6. A locking valve comprising, a valve body having a valve seat, a valve member rotatable on the seat, said valve member having an internally serrated bore, an operating stem having a serrated end slidably fitting within the bore with the serrations interfitting to form a driving connection, a cap secured to the valve body, a spring interposed between the valve member and the stem for holding the valve member on its seat with the stem reacting against the cap, a locking member non-rotatably and slidably carried by the stem, said stem having a bore therein, a second spring in the bore acting upon the locking member, means on the stem against which the second spring reacts whereby the second spring, locking member and stem are shiftable axially as a unit without compression of the second spring, a locking notch, said locking member having a part receivable in the locking notch by the action of the second spring to lock the valve member against rotation and being disengageable from the notch by axial movement of the stem against the action of the first mentioned spring whereby the valve member may be rotated.

ERVIN H. MUELLER.